Patented June 16, 1931

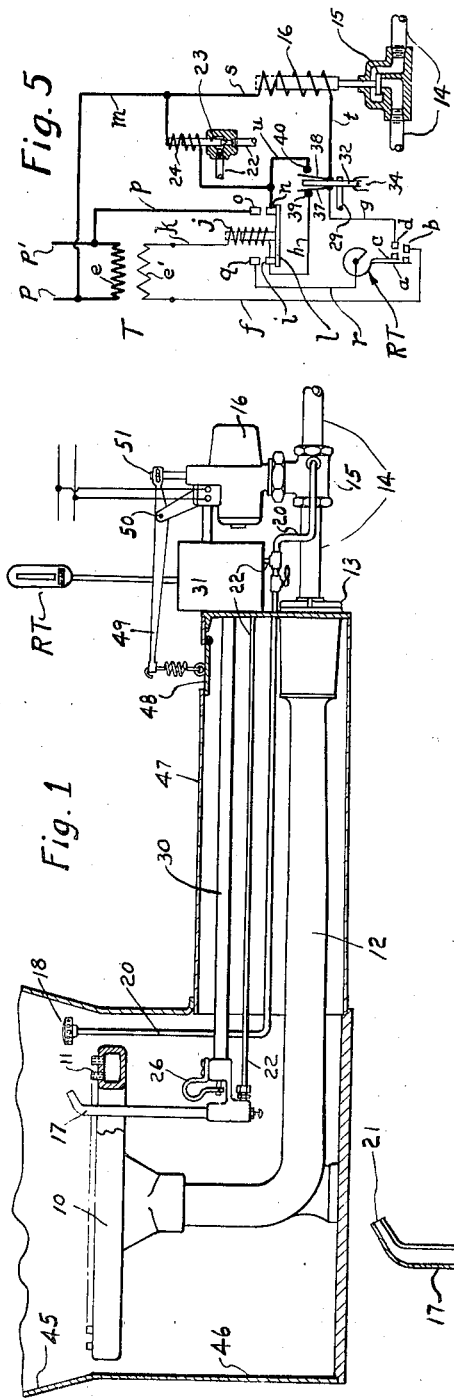

1,810,123

UNITED STATES PATENT OFFICE

NELSON T. BRANCHE AND VILYNN O. BEAM, OF TOLEDO, OHIO, ASSIGNORS TO SURFACE COMBUSTION CORPORATION, OF TOLEDO, OHIO, A CORPORATION OF NEW YORK

FLUID-FUEL-BURNER CONTROL

Application filed May 12, 1930. Serial No. 451,635.

This invention relates to improvements in controlling means for gas burning apparatus of the type primarily adapted for use in connection with house heating furnaces.

Automatic gas burning apparatus for house heating furnaces generally includes a normally burning pilot and a room thermostat for controlling the operation of a burner fuel-supply motor, the pilot usually being combined with a thermostat or heat-responsive means which will prevent the burner motor from being operated unless the pilot is burning.

However, it not infrequently happens that the gas pressure in the supply main is at times so low as to render operation of the burner extremely hazardous and yet due to the fact that the gas pressure is not low enough to cause the flame at the pilot to entirely die out and thus to allow the pilot thermostat to cool sufficiently to break the room thermostat circuit to the burner fuel-supply motor, the latter will be automatically operated by the room thermostat to admit gas to the burner notwithstanding that the flame from the pilot may not be of sufficient length to reach the gas flowing from the burner and consequently the furnace will gradually fill with gas and eventually cause an explosion.

Now it is an object of the present invention, to provide means for preventing the burner fuel-supply motor from being operated unless the gas pressure is sufficient to warrant operation of the burner and to this end there is provided a normally-out or safety pilot to which gas is automatically admitted when the room thermostat calls for heat but which can not be ignited unless the gas pressure is sufficient to warrant operation of the burner, the pilot controlling a heat-responsive means which unless the pilot is burning will prevent operation of the burner fuel-supply motor.

Another object is to provide a controlling system which shall require the heat-responsive means associated with said safety-pilot to cool, following cut-off of the fuel supply to said pilot upon the room thermostat moving to no-call-for-heat position, before fuel can again be admitted to the safety pilot in order that should the room thermostat again call for heat before said heat-responsive measure has had an opportunity to cool, a resumption of fuel supply to the safety pilot can not be effected by said thermostat, thereby preventing said thermostat from automatically causing fuel to be admitted to the main gas burner. This feature of the invention may be termed a "recycle" feature since it requires the same series of steps to be gone through each time the room thermostat moves from call-for-heat-position to no-call-for-heat position and back again irrespective of the shortness of time between such positions. By providing for recycling as said, all danger of the gas supply to the main burner being effected while the safety pilot is out is effectively prevented.

The above and other features of the invention will more fully appear from the detailed description taken in connection with the accompanying drawings wherein the preferred embodiment of the invention is shown.

Referring to the drawings:

Fig. 1 is illustrative of one type of gas burning apparatus with which the invention has special utility, this apparatus being adapted for use with house heating furnaces;

Fig. 2 is a view on an enlarged scale of a portion of the apparatus shown in Fig. 1;

Fig. 3 is an enlarged detail view of mechanism shown in Fig. 2,

Fig. 4 is an end elevation of the mechanism shown in Fig. 3;

Fig. 5 illustrates diagrammatically the preferred controlling circuit of the present invention, this circuit containing a room thermostat of the two-blade-contact type, and Fig. 6 shows a controlling circuit substantially similar to that shown in Fig. 5, the principal difference being that due to the use of a single blade thermostat.

In the drawings, 10 indicates the main gas burner which may be of any suitable form, the form shown being of the hollow ring type having plurality of discharge tips 11 in its top, the burner being supplied with a mixture of air and gas by a mixing tube 12 at the front end of which is an air shutter 13 for regulating the amount of primary air entrained by the gas discharged into the mixing tube from the gas supply pipe 14 as is customary in atmospheric type gas burners. 15 indicates the main gas valve in the supply pipe 14; 16 the motor for operating said valve; RT the room thermostat, and 17 a normally-out pilot.

The means for igniting the pilot is shown as a continuously-burning relatively-small-flame pilot 18 supplied with gas by pipe 20 which leads from the inlet side of the main valve 15. However it is not essential that the safety-pilot-igniting means be an open flame. It may for example be a hot wire or platinum sponge or any other suitable means. As shown, the pilot 17 and the igniting means 18 therefor are preferably arranged some distance apart for reasons presently appearing.

Let us assume for the moment that gas is being supplied to the normally-out pilot 17; the gas will then issue from the tip 21 thereof and if the gas pressure be sufficient to project the gas into igniting relation with lighting means 18 it will, of course, be ignited, whereas if the gas pressure be too low to project the gas from the safety pilot as said, the gas will not be ignited but will continue to flow until such time as the requisite gas pressure prevails unless previously shut off. The fact that gas will continue to flow as said without being ignited will ordinarily be of no serious consequence for the reason that ventilation of the furnace is usually sufficient to prevent danger of explosion from such source.

Gas is supplied to the normally-out pilot 17 by a conduit 22 shown as a branch from pipe 20, there being provided in said conduit a valve 23 adapted to be opened by any suitable motor, as for example, a solenoid 24 of which the valve then forms the movable core. For the moment it will suffice to say that when the room thermostat calls for heat the solenoid 24 will be actuated to open the valve 23 whereupon gas will flow to the pilot 17. For regulating the amount of gas admitted to said pilot there is provided at a suitable point in said conduit a regulating valve 22'.

Secured to the same support 25 as the pilot 17 is a heat-responsive means shown as a looped bi-metal blade 26, one end of which is free to move relatively to said support. The pilot 17 is provided with a longitudinally-extending relatively narrow slot 27 leading from its tip 21 to a point adjacent the base of the tube. Flame issuing from said slot will, of course, heat said blade or element 26 thereby causing the free end thereof to move as will be readily understood. In the present instance it can be assumed that the free end of said blade moves to the right upon being heated.

Secured to the free end of said element 26 as by a pintle 28 is a rod 29, this rod being housed by a tube 30 which at one end is secured to said support 25 and at its other end to a casing 31, the cover of which is removed in Fig. 2. Within the casing is a two-pole switch comprising an upright arm 32 pivoted at its lower end as at 33 to a support 34 suitably secured to said casing, this arm being connected to said rod 29 for movement thereby in a manner presently described, said arm preferably being of insulating material, and having secured thereto as by individual screws 36, opposite flexible switch blades 37 and 38, the free ends of the blades normally standing away from the upper end of the arm as clearly shown in Fig. 3 and adapted to contact with fixed terminals 39 and 40 respectively, which form part of the controlling circuit presently described.

In order to maintain the free ends of said blades 37 and 38 a given distance from said arm there is secured to the upper end thereof a fitting 41 having depending projections between which and said arm the blades are movable as will readily be understood. For clarity of illustration, the distance between the arm and the respective upper ends of the blades is somewhat exaggerated since ordinarily the spacing will be relatively small, say $\tfrac{1}{32}$ of an inch or less. A two-pole switch having flexible blades as described while preferred is not absolutely essential to the present invention, the principal advantage being that there is less likelihood of accidental make-and-break contact due to slight movement of the switch arm 32, as for example, movement resulting from jarring of the apparatus.

The connection between the switch arm 32 and the rod 29 is an impositive one, namely, a frictional connection in order that the rod 29 may be free to move relatively to said arm after the limit of movement of the arm 32 has been reached by engagement with the terminals 39 and 40.

Said impositive or frictional connection is shown as comprising a spring clamp 42 secured to the arm in any suitable manner as by a screw 43, the arm being provided with a suitable opening through which the rod 29 is free to move. It will now be seen that irrespective of the distance the rod 29 may be moved by expansion and contraction of the bi-metal blade 26, the distance the switch arm 32 can be moved is limited by the fixed terminals 39 and 40.

The use of an impositive connection between the switch arm and thermal element 26 is a feature of great practical importance, the outstanding advantage being that irrespective of the distortion which may take place in the thermal element due to continued use, there is never any necessity for making adjustment between the switch arm and thermal element such as is of necessity required where the connection is positive, in order to compensate for such distortion.

It will, therefore, be seen that the present invention provides an automatic compensating means between the switch and the thermal element. It will, of course, be evident to those skilled in the art that the use of an impositive connection for the purpose described is not dependent on the use of a looped thermal element 26 of the type shown, the main essential being that upon being heated by the pilot 17 the thermal element shall be capable of imparting movement to the rod 29.

Referring to Fig. 1 the burner 10 is shown as positioned within the fire box of a domestic house heating furnace, the furnace being diagrammatically illustrated, the fire box being indicated at 45 and the ash pit at 46; the grates having been removed to make place for the gas burner apparatus, the longitudinally extending casing 47 being positioned to deliver secondary air for the burner through the ash pit door opening, a damper 48 being provided in the casing for that purpose, this damper being operable by a lever 49 pivoted as at 50 to a bracket extending from the housing of the burner fuel-supply motor 16, said motor being shown as including a reciprocable element 51 with which the lever is suitably connected for opening and closing the damper when the motor opens and closes the gas valve 15, respectively. The motor 16 may be of any suitable type, the main essential being that it shall contain instrumentalities subject to control by an electric circuit which includes the room thermostat.

Referring now to Fig. 5 which shows the preferred form of controlling circuit, the burner fuel-supply motor 16 has been shown as a solenoid for simplicity of description. The room thermostat RT is preferably of the two-blade-contact type, the blades being flexible and of unequal length, the longer blade —a— making contact with its fixed terminal —b— approximately 2° in temperature before the shorter blade —c— makes contact with its fixed terminal —d— and breaking contact with said terminal —b— the same number of degrees after the shorter blade breaks contact with its said terminal —d—.

When the room thermostat calls for heat, blade —a— contacts with —b— followed by blade —c— contacting with —d—. Upon said contacts being made, the circuit through the safety-pilot motor or solenoid 24 is completed and the gas valve 23 opens, the circuit being as follows beginning and returning from the secondary —e'— of transformer T: wire —f— terminal —b—, blades —a— and —c—, terminal —d—, wire —g—, switch blade 37 (the thermal element 26 being cold), terminal 39, wire —h—, terminal —i—, relay coil —j—, and wire —k—. The coil —j— being energized, the switch —l— closes and thereupon the safety-pilot solenoid 24 is energized whereupon the safety pilot gas valve 23 is opened, the circuit through said solenoid being from the primary —e— of the transformer T as follows: wire —m—, coil 24, terminals —n— and —o—, and wire —p—. When switch —l— is closed, the current no longer flows through the short blade —c— of the room thermostat RT by way of the switch blade 37, the circuit through the room thermostat then being through terminals —i— and —q—, and wire —r—.

Assuming now that the safety pilot 17 is burning and is heating the thermal element 26; the thermal element then moves the rod 29 to the right sufficiently to bring the safety-pilot switch blade 38 into engagement with terminal 40. When this happens the main gas valve 15 opens, the circuit through the motor coil 16 being as follows from the primary —e— of transformer T: wires —m— and —s—, coil 16, wire —t—, blade 38 and terminal 40, wire —u—, terminals —n— and —o— and wire —p—.

Suppose now there is no call for heat. The room thermostat blade —c— first breaks contact with —d— followed by blade —a— breaking contact with —b—. The circuit through relay coil —j— is thereupon broken (contact between —a— and —b— being broken) whereupon the circuits through the burner motor 16 and solenoid 24 are simultaneously broken which results in automatic closing of the main gas valve 15 and the safety pilot gas valve 23.

The provision of means for automatically cutting off the flow of gas to the safety pilot upon the room thermostat moving to no-call-for-heat position and requiring that the safety pilot be reignited when the room thermostat moves back to call-for-heat position before the main gas valve can be opened is an important feature of the invention, since if at the time the room thermostat again moves to call-for-heat position the gas pressure is insufficient to cause a jet of gas flowing from the orifice 21 in the safety pilot 17 to reach the igniting means 18, it follows that the safety pilot cannot be ignited and hence the apparatus will remain non-operative as regards opening of the main gas valve for the burner 10.

The circuit shown in Fig. 6 is substantially the same as that shown in Fig. 5, the difference being due to the different type of room thermostat employed, the parts corresponding to Fig. 5 being identified by the same reference characters. In Fig. 6 the room thermostat is of the type requiring movement of a single blade between two fixed terminals, the blade being identified by reference character —a'— and the fixed terminals by —b'— and —c'— respectively. In the lay-out as shown it is assumed there is no call for heat. Assuming now there is call for heat, blade —a'— then moves into engagement with —c'— and thereupon the relay switch —l— closes whereupon the solenoid coil 24 is energized and the pilot gas valve 23 opened. If the pilot ignites, the switch arm 32 will move to the right due to heating of element 26 thus making contact between 38 and 40 and breaking contact between 37 and 39. The circuit through the burner motor 16 is then closed as will be readily appreciated whereupon the main gas valve 15 will be opened. When thermostat blade —a'— moves to the left, that is to say to no-call-for-heat position, the relay coil —j— is short-circuited the circuit being from —e'— as follows: wire —f'—, blade —a'—, wire —r'— terminals —i— and —q— and wire —w—. Upon being short circuited, the relay switch —l— opens whereupon the pilot and burner valves 23 and 15 automatically close. Upon the pilot thermostat 26 cooling, the pilot switch 32 moves to the left and contact is reestablished between 37 and 39 as will now be readily understood.

It will be noted that the safety pilot 17 is always extinguished upon the room thermostat moving to no-call-for-heat position and consequently the same set of steps must always be gone through to reignite the pilot when there is a call for heat by the room thermostat.

The flame from the safety pilot 17 is of course relied on to light the main gas burners, said flame preferably being directed over said burner. Regardless of the type of pilot lighting means used, the space relationship therebetween should preferably be such that unless the gas pressure is sufficient to project the gas a predetermined distance the pilot will not become ignited.

It will be noted that the controlling circuit is such that once the room thermostat moves to no-call-for-heat position an immediate return of said thermostat to call-for-heat position would not cause the pilot fuel-supply motor to open the gas supply to the pilot. The condition precedent to such action taking place is that the safety switch 32 be at the left as viewed in Figs. 5 and 6 and this cannot happen until the pilot thermal element 26 has had time to cool and thereby moving said switch to the left. This arrangement is an important feature of the invention since it effectively precludes any possibility of the main gas valve 15 being opened while the safety pilot is out. This feature of the invention we term the "recycling" feature since the same sequence of step must always be gone through beginning with a cold thermal element 26.

What is claimed is:

1. The combination with a fluid fuel burner and a master thermostat for controlling the operation thereof, of a normally-out pilot, means for admitting fuel to the pilot when the thermostat calls for heat, a heat-controlled mechanism, means under the joint control of said thermostat and said mechanism and adapted when said mechanism permits to admit fuel to said burner, and means for lighting said pilot, the latter when lighted supplying the heat required by said mechanism to permit its cooperation with said thermostat for the said purpose, the pilot and lighting means therefor being positioned at opposite sides of said burner.

2. The combination with a fluid fuel burner and a master thermostat for controlling the operation thereof, of a normally-out pilot, means for admitting fuel to the pilot when the thermostat calls for heat, a moveable member, means under the joint control of said thermostat and said member and adapted when said member permits to admit fuel to said burner, means for lighting said pilot, the pilot and said lighting means being positioned at opposite sides of said burner in such space relation that the fuel-supply pressure must be at a predetermined minimum before the fuel issuing from the pilot can bridge said space and be ignited by said lighting means, and a thermostat adapted to be heated by said pilot and adapted when hot to actuate said member in a manner to permit fuel to be admitted to said burner as said.

3. The combination with fluid fuel burner and a master thermostat for controlling the operation thereof, of a normally-out pilot at one side of the burner, a burner fuel-supply motor in circuit with said thermostat, means controlling said circuit for preventing actuation of said motor when the pilot is out and permitting actuation thereof when the pilot is burning, a pilot fuel-supply motor under control of said thermostat for admitting fuel to the pilot when the thermostat calls for heat, and means at the other side of the burner for igniting said pilot, said pilot and igniting means being in such space relation that the fuel-supply pressure must be at a predetermined minimum before the fuel issuing from the pilot can bridge said space and be ignited by said igniting means.

4. The combination specified in claim 3, characterized by said circuit-controlling means comprising a thermostat controlled by said pilot and a switch controlled by the pilot thermostat.

5. The combination specified in claim 3, characterized by said circuit-controlling means comprising a thermostat controlled by said pilot and a switch controlled by the pilot thermostat, the latter being impositively connected to said switch in a manner to permit the pilot thermostat to move independently of the switch after a predetermined initial movement of the latter.

6. The combination with a gas burner and a master thermostat for controlling its operation, of a normally-out pilot at one side of the burner, a heat-responsive means associated with said pilot, a burner fuel-supply motor and switch in circuit with said thermostat, said motor when actuated permitting gas to flow to said burner and said switch being so controlled by said heat-responsive means that unless the pilot is burning the said circuit will be open and the motor incapable of actuation by the thermostat even though it calls for heat, means controlled by the thermostat for admitting gas to the pilot when the thermostat calls for heat, and means at the other side of the burner for igniting the pilot, the latter when ignited allowing the heat-responsive means to actuate the switch to close said circuit whereby the motor may be actuated by the thermostat to admit gas to the burner, said pilot and igniting means being in such space relation that the fuel supply pressure must be at a predetermined minimum before the fuel issuing from the pilot can bridge said space and be ignited by said igniting means.

7. The combination with a gas burner and a master thermostat for controlling its operation, of a normally-out pilot, a heat-responsive means associated with said pilot, a burner fuel-supply motor and switch in circuit with said thermostat, said motor when actuated permitting gas to flow to said burner and said switch being so controlled by said heat-responsive means that unless the pilot is burning the said circuit will be open and the motor incapable of actuation by the thermostat even though it calls for heat, means controlled by the thermostat for admitting gas to the pilot when the thermostat calls for heat, means for igniting the pilot, the latter when ignited allowing said heat-responsive means to actuate the switch to close said circuit whereby the motor may be actuated by said thermostat to admit gas to the burner, said thermostat when it moves to no-call-for-heat position causing automatic cut-off of the flow of gas to the burner and the pilot, and means preventing the thermostat from again causing gas to flow to the pilot until the said heat-responsive means has cooled sufficiently to actuate said switch.

8. The combination with a fluid-fuel burner and a master thermostat for controlling its operation, of a normally-out pilot, means controlled by said thermostat for admitting fuel to said pilot when the thermostat calls for heat, a burner fuel-supply motor requiring to be actuated before fuel can be admitted to said burner, heat-responsive means controlled by said pilot, means controlled by said heat-responsive means preventing actuation of said motor until after the pilot is ignited, means for igniting said pilot, said means for admitting fuel to said pilot automatically cutting off fuel thereto when the thermostat moves from call-for-heat position, and means controlled by said heat-responsive means for preventing admission of fuel to the pilot even though said thermostat is in call-for-heat position until the heat-responsive means has been free from the influence of heat from the pilot for a predetermined time.

9. In a control system for fluid-fuel burners, the combination of a burner fuel-supply motor, a normally-out pilot, a pilot fuel-supply motor, a room thermostat, said thermostat when in call-for-heat position automatically actuating said pilot motor to admit fuel to the pilot, heat-responsive means under the control of said pilot, means for igniting said pilot, means controlled by said heat-responsive means for preventing actuation of said burner motor unless the pilot is burning, means permitting the burner motor to be automatically actuated by said thermostat when the means controlled by said heat-responsive means permits, means for automatically disconnecting the pilot and burner motors from control by said thermostat when the latter moves to no-call-for-heat position, and means preventing immediate restoration of control to said thermostat of the pilot motor regardless of said thermostat being in call-for-heat position until such time as the heat imparted to said heat-responsive means has had time to be dissipated whereby to leave said heat-responsive means substantially cold.

In testimony whereof we affix our signatures.

NELSON T. BRANCHE.
VILYNN O. BEAM.